Nov. 6, 1951     C. L. SINGLETON     2,573,814
CATALOGUING MACHINE
Filed July 1, 1950     3 Sheets-Sheet 1
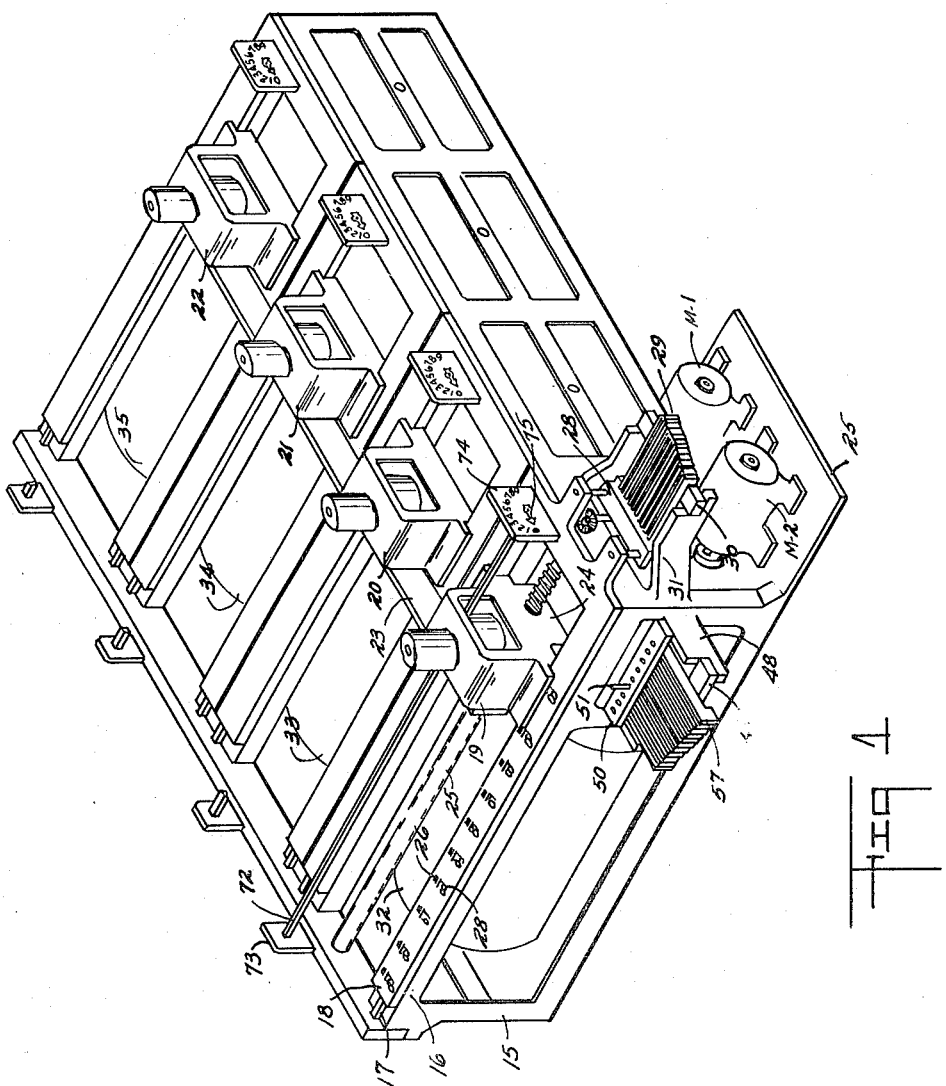
INVENTOR.
CLIFFORD LEE SINGLETON
BY
Attorney Nov. 6, 1951  C. L. SINGLETON  2,573,814
CATALOGUING MACHINE
Filed July 1, 1950  3 Sheets-Sheet 2
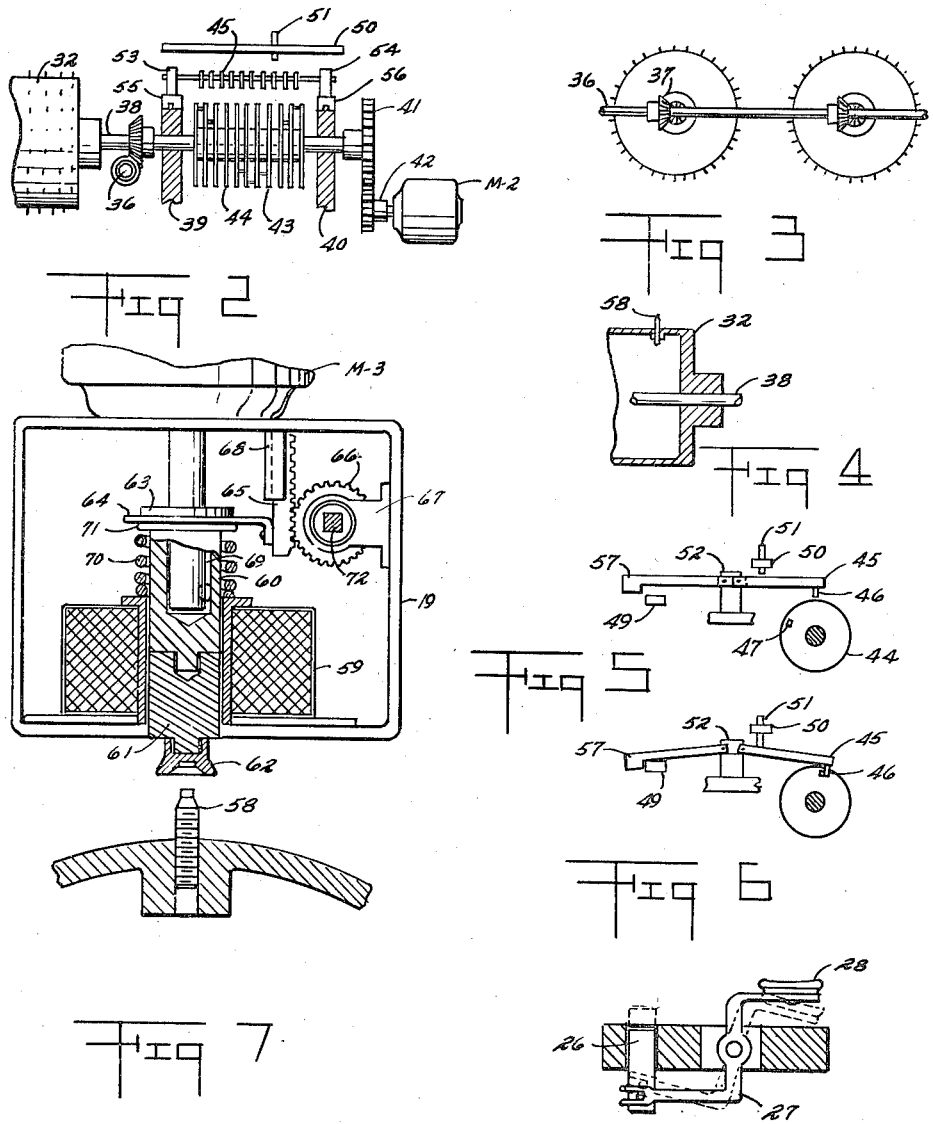
INVENTOR.
CLIFFORD LEE SINGLETON
BY
Attorney

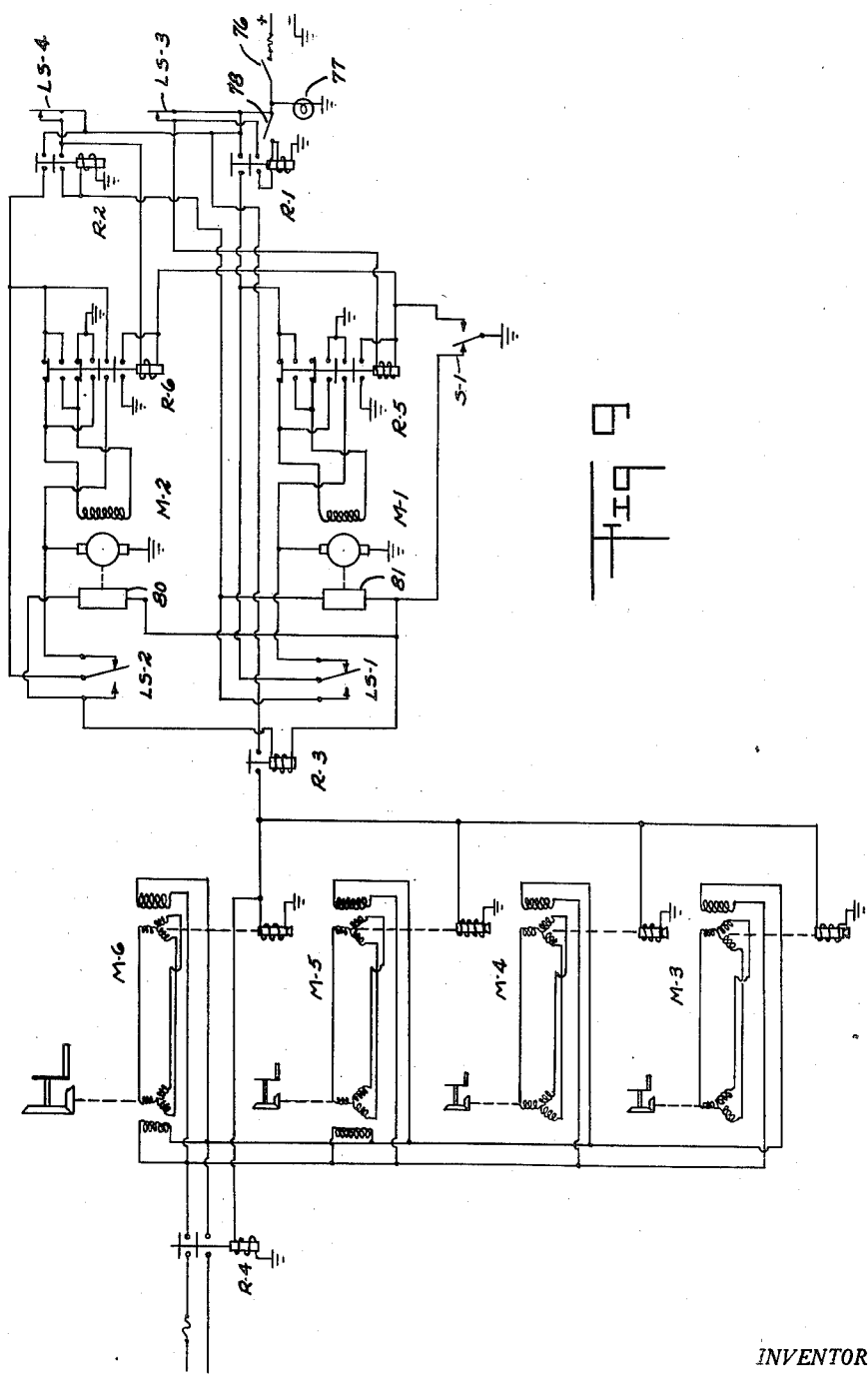

Patented Nov. 6, 1951

2,573,814

UNITED STATES PATENT OFFICE 2,573,814

CATALOGUING MACHINE

Clifford Lee Singleton, Atlanta, Ga., assignor to General Developers Company, Atlanta, Ga., a partnership Application July 1, 1950, Serial No. 171,658

5 Claims. (Cl. 177—353)

This invention relates to a cataloging machine and more in particular to a machine which checks a combination of characters such as a code or catalog number against a master tabulator for identification of the particular characters or code entered into the machine.

This application is a modification of my co-pending application, Serial No. 171,656, filed July 1, 1950, for Verifying Machine, and the invention is a continuation-in-part or modification of an invention of a somewhat similar machine disclosed in my co-pending application filed April 26, 1950 and bearing the Serial No. 158,312, which machine disclosed certain mechanisms for identifying the character group by one of two signals.

The present modification is intended to check or identify a color group, character group or code number such as a catalog or stock number of an item, which, for example, when placed in the present machine will automatically give the price of the item carrying that particular stock number. The price may be either the selling price or the purchasing price paid by the wholesaler or distributor; or the indication may be of a size, quantity, etc.

Where large distributors and warehouses stock several thousand items, the various clerks cannot rely on their memory to state the many prices or discounts on any item, but refer to various catalogs for these prices. As a matter of convenience, the catalogs are usually compiled to include different classes of items; such as placing all hardware items in one catalog, all furniture in another, etc, until all the goods have been priced and cataloged. Constant handling of these catalogs tends to mutilate them to such an extent that they become illegible and are occasionally misplaced and lost. Reference must then be made to a master list or even to the invoice before the prices can again be calculated. Clerks and salesmen not familiar with either the prices or the classification of the various items are embarrassed in that they must ask or detain the buyers while they consult one of the price books.

It is readily apparent that a machine which would, in a matter of seconds, present the price of 10,000 items or more, would be highly advantageous in the merchandising field.

It is an object of the invention to provide a machine which will automatically give the price or other information regarding an item the code number of which is entered on the keyboard of the machine.

A further object of the invention is to provide a machine which will identify any combination of four digits corresponding to the same number of digits or letters in a code. The number of digits may be increased by only a slight addition to the machine.

A further object of the invention is to provide a machine wherein any price or character group responsive to its code number may be changed at the will of the operator.

Another object of the invention is to provide an electrical circuit for the movements of the machine including limit switches for positioning the movements over pin-point locations of the character groups, and an automatic return of these movements to a zero position.

A further object of the invention is to provide a machine wherein the movements for identification of a character group and the return to a zero position is made by a single reversing switch.

A further object of the invention is to provide a machine which is relatively easy to manufacture and rugged enough to withstand the constant wear to which machines of this type are usually subjected.

Further objects and advantages of the invention will become apparent in the course of the following detailed description when viewed together with the accompanying drawing in which:

Fig. 1 is an isometric view of an embodiment of my invention.

Fig. 2 is a broken detail view showing the driving means for rotating a main drum and certain stop selecting members for stopping the drum rotation in selected positions.

Fig. 3 is a detail view showing the means of simultaneously driving several of the drums.

Fig. 4 is a broken view of one end of the main drum.

Fig. 5 is a detail view showing more or less diagrammatically the mechanism employed for stopping the main drum in a selected position.

Fig. 6 is a view similar to that of Fig. 5 showing the stop members in an operative position.

Fig. 7 is an enlarged detail view showing how the depth control of a solenoid plunger is used to rotate a shaft for presenting a given number in the code.

Fig. 8 is a detail view of the stop arrangement used for positioning a movable carriage to a longitudinal position over the main drum.

Fig. 9 is a circuit diagram of the machine.

In the drawings, numeral 15 designates a main framework made more or less rectangular in shape as shown in Fig. 1 and having suitable side and end members arranged to carry the several members as will be pointed out later in this description.

The top faces of each of the upper longitudinal cross members 16 of the framework are machined flat and provided with keys 17. Four U-shaped frames 18 are provided with keyways in their respective side members adapted to be fitted over the keys on their respective top frame members 16 whereby each frame may be moved longitudinally across the top of the main framework 10. I have further provided positioning carriages 19, 20, 21 and 22 arranged to slide upon their respective U-shaped frames 18 along the top of the main framework 10. These positioning carriages are linked together by a common actuating bar 23 by means of which all of the carriages are moved simultaneously.

It will be noted that the foremost carriage 19 is provided with a depending bottom portion 24 in which I have positioned a prepared nut (not shown) which engages a lead screw 25. The lead screw 25 is thus extended through the first carriage with its ends journaled in end members of the main framework 10. It can now be seen that when the first carriage 19 is moved backward and forward across its U-shaped frame, the other of the carriages will move correspondingly since each are connected by the common actuating bar 23.

For rotating the lead screw 25 for the carriage movement, I have provided an electric motor M–1 mounted on a prepared shelf connected to the main framework, and connected to the lead screw by means of suitable shafts and gears (not shown).

Along the side member of the foremost U-shaped frame 18 I have provided a series of ten manually operable stops 26 placed in the path of the first movable carriage 19 and adapted to limit the travel of the same. A detail of the stop arrangement is illustrated in Fig. 8 of the drawings wherein the stop 26 is shown in raised and lowered positions by means of the pivoted actuating lever 27 and the button 28; that is, when any one of the ten buttons 28 is depressed, it raises its corresponding stop pin 26 into the path of the moving carriage to stop the same, together with the other connecting carriages, at the selected point of travel down the U-shaped frame 18.

It will be noted that each of the U-shaped frames is made slightly less in length than the total length of the main framework 10, so that when the carriage 19 strikes one of the selected stops 26, the entire U-shaped frame, together with all others connected thereto, will be moved along the main framework until all movement is stopped by another means as will now be described.

At the forward end of the foremost U-shaped frame 18, I have provided a depending structure 28 supporting a series of ten selector fingers 29. These selector fingers are arranged so that when depressed, they will engage a stop bar 30 affixed transversely across a prepared yoke 31 on the main framework 10. These fingers are staggered in length in increments of one-eighth of an inch and the final finger is held in a constant depressed position as a final stop to the carriage and frame movement. In other words, by depressing the shortest of the fingers, the carriage and frame 18 is permitted to move one-eighth of an inch after the carriage strikes any of the selected stops 26. Each of the fingers 29 is, of course, provided with an electrical limit switch which breaks the current supply to the driving motor M–1 as soon as the finger makes contact with the stop bar 30. It is apparent, therefore, that by using various combinations of the fingers and stop pins, the four carriages can be made to stop automatically at many selected positions longitudinally along the main framework 10.

Beneath each of the carriages mentioned above and suitably journaled for rotation in the end members of the main framework 10 are four identifying drums 32, 33, 34 and 35. Each of these drums is adapted for rotation in a plane at right angles to the plane of movement of the carriages by means of a common drive shaft 36 and a set of bevel gears 37 in the manner illustrated in Fig. 3 of the drawing. Thus, when the carriages are simultaneously moved to a given position along the framework 10, they are simultaneously positioned at corresponding spots over each drum.

The foremost drum 32 is rotated in the manner illustrated in Fig. 2 which shows the drum shaft 38 extended through frame members 39 and 40 and provided with a driven gear 41 enmeshed with a driving gear 42 on the shaft of an electric motor M–2. Intermediate the frame members 39 and 40 is a stop drum designated generally by the numeral 43. This stop drum actually consists of eleven equally spaced discs 44 affixed to the shaft 38 and which form guides for an inner group of fingers 45. The forward end of each finger is provided with a stop pin 46 engageable with its respective stop 47 glued or otherwise affixed between two of the discs 44 constituting the stop drum 43. It will be noted that the stops between the discs are staggered spirally around the drum length; the first stop, in this instance, being positioned an arcuate distance of one and one-eighth inches away from the stop pin 46 on the finger 45. In other words, should the initial or first of the fingers be depressed, the drum 43 would rotate an arcuate distance of one and one-eighth inches before striking the stop pin 46. The succeeding stops between the discs are positioned to allow drum rotation in increasing increments of one and one-eighth inches until the drum reaches the final stop.

As noted in Fig. 1, the side of the frame is also provided with a yoke 48 and a stop bar 49 similar to the arrangement at the end of the machine. Spaced across the arms of the yoke 48 is a positioning bar 50 having a series of ten holes therethrough and placed in alignment with the set of forward fingers 45. By placing the selector pin 51 in any one of the holes in the positioning bar 50 an operator is able to depress the corresponding finger positioned beneath the pin so that its forward stop 46 is forced into the space between two of the discs 44 and in such alignment with the stop 47 that it will stop the drum rotation when the two stops engage as in the manner illustrated in Fig. 6. It will be remembered that each of this set of forward fingers 45 is pivotally mounted to a common yoke plate 52 which has its ends affixed to vertical standards 53 and 54 affixed to runners 55 and 56, as seen in Fig. 2. These runners are adapted to slide transversely into and out of the machine frame much in the same manner as described for the upper U-shaped frames 18.

On the opposite side edge of the yoke bar 52 is another set of ten selector fingers 57 pivotally mounted to the yoke bar and extended outwardly in the same manner as the set of first described fingers 29. These fingers are also adapted, when depressed, to engage their respective stop bar 49 to limit the travel of the runners 55 and 56 and consequently the rotation of the drum 43. The fingers 57 are further made in increasing lengths by one-eighth of an inch with the final finger in this group also being permanently depressed to provide a final stop for the movement. In reality, the stop pins 46 on the forward set of fingers 45 might be called the initial stop pins and the rear set of fingers 57 called the final stop pins. It can be seen that when the rotation of the drum 43 is checked by the forward stop pin 46 as it is engaged by the rotating stop 47, the runners 55 and 56, together with the yoke bar 52, and consequently the set of rear fingers 57, are drawn forwardly into the machine frame 10 until one of the depressed fingers 57 in the outer group finally strikes the stop bar 49 to stop all rotation of the stop drum 43. Since the drum 32 is mounted on a common shaft 38 with that of the stop drum 43 and is made to rotate all of the other drums 33, 34 and 35, then all of the drums are stopped when the selected stop finger 57 strikes the stop bar 49.

It can now be seen that the selector pin 51 may be used to depress any of the fingers in the inner finger group 45 while at the same time any one of the outer fingers 57 may be depressed for final movement. With such combinations as might be made between the pin and fingers, the drums may be stopped at varied positions in their rotation up to one revolution.

It is also apparent that the longitudinal movement of the carriages can be pre-selected with respect to increments of rotation of the identifying drums so that when a given combination representing a code or stock number is entered in the machine, the carriages will be moved to a given spot on the periphery of the various drums.

In the broken view illustrated in Fig. 4, each of the identifying drums is seen as a hollow closed cylinder provided with numberous depth stops 58 screwed into the periphery of the cylindrical drum walls and serving as stops to limit the downward travel of a solenoid plunger as will now be described. The positioning of these depth stops is, of course, calculated in an exact relationship to the movement of the carriages described above and also to the amount of drum rotation so that the depth stop selected will be in a true vertical plane beneath the respective carriage and ready to receive the indicating movement actuated by the downward movement of the solenoid plunger.

In Fig. 7 I have disclosed one means by which the above movement is accomplished. It is to be remembered that while the following description refers to only one of the mechanisms as shown in the figure, that all of the four carriages 19, 20, 21 and 22 employ the same component parts and are actuated for movement simultaneously when current is passed through their respective solenoids.

In the carriage frame 19 I have placed a conventional solenoid 59. The solenoid plunger is made of an upper piece 60 of iron or other material used for this purpose, and a center piece 61 made of some non-magnetic material and a lower wrench head 62 made of hardened steel.

The upper piece 60 of the plunger is provided with a flanged head 63 underneath which I have positioned a slip ring 64. The inner end of the slip ring 64 is connected to a vertically positioned rack 65 enmeshed with a pinion 66 journaled upon brackets 67 mounted to the inner side walls of the carriage housing. The rack is adapted to slide vertically in a prepared slide or trough 68 to prevent any radial movement when the motor M-3 is being actuated for the setting of the contact pins 58.

It will be noted that the upper piece 60 of the plunger is provided with an internal bore and keyway 69 so as to permit the same to be moved longitudinally upon the shaft of the motor M-3 while still being turned radially by means of a key placed on the end of the motor shaft and riding in the keyway 69. Actuation of the solenoid 59 will draw the entire plunger into its core when energized by an electric current; and when the current is removed, the plunger will be returned to its normal upper position by means of a compression spring 70 placed between the solenoid and a washer 71 positioned beneath the slip ring 64.

The pinion 66 is provided with a square central hole through which I have extended a square bar 72 so aligned across the length of the machine as to permit the pinion to slide along the bar 72 and yet be oscillated at any time or position by means of the solenoid 59 and the rack 65. The square bar is journaled in a rear standard 73 and one 74 at the front of the machine. The front standard 74 is further provided with a set of numbers from zero to nine spaced more or less in a semicircle across the outer face thereof, as seen in Fig. 1. An indicating arrow 75 is affixed to the forward end of the square bar 72 and arranged so that, when the solenoid is de-energized, the arrow rests on, or pointing to, the zero digit of the set of numbers. It is readily seen, now, that when the solenoid is energized and the square bar is rotated by the rack and pinion, the bar will be rotated for a distance corresponding to the depth that the contact pin 58 will permit, and so place the indicating arrow 75 in alignment with a number on the forward standard 74.

The motor M-3 is used for setting the depths of the contact pins, hence for setting the indicating arrow to any given number. Since each of the motors M-3, M-4, M-5 and M-6 are separately operable, it is apparent that the order of digits which may be made to appear reading from left to right on the front standards is almost unlimited. When the solenoid is energized, the wrench head 62 is brought into operative engagement with the contact pin 58 for visual indication of the depth by a corresponding arrow and number. While in this position, an operator may change the depth of the contact pin by simply actuating either a forward or reversing switch to the motor for rotation of the contact pin 58 to screw the same into or out of the drum. Thus, when a given code number has been once set into the machine, it may be referred to for the visual indication of the selling price of the item bearing that code number. For example, if the code or catalog number of a certain item was 5426 and the price of the item had been previously set into the machine, verification of this price or reference to it could be made at any time by setting the code 5426 into the machine and reading the dollars and cents on the visual indicating means.

As a complete example of the operation of the device in identifying a given code, stock number, color combination or other indicia, reference is made particularly to the circuit diagram of Fig. 9 and to the other views of the drawing.

Due to the simplicity of control circuits, the device is arranged in the present instance for use from a source of D. C. supply. The current enters through a main On-Off switch 76 using a "bull's-eye" or pilot light 77 to indicate when the machine is receiving current.

Let it be assumed that the price of a particular item is sought and that the item bears the stock number of 4327. As before stated, the present invention is intended to identify a given stock number by a particular contact point placed on the surface of a revolving drum, therefore the order of entry of the stock digits is of no consequence except that the same order must be followed that was used in the initial setting of the code into the machine. Let it be said, therefore, that the selector pin 51 and the finger group 57 were used, respectively, to set up the units and tens of the stock number 4327, and that the carriage stop pins 26 and the other finger group 27 were used, respectively, to set up the hundreds and the thousands in the stock number 4327. Knowing the order of procedure, which might be printed on or otherwise tagged to the machine, the operator enters the stock number into the machine for identification as follows: first; by placing the selector pin 51 into the fourth hole from the left and pressing downwardly to depress the corresponding finger beneath in the manner illustrated in Fig. 6. Second; by depressing the third finger of the corresponding finger group 57. Third; by depressing the second button 28 from the rear end of the machine to raise its corresponding stop pin 26, then by depressing the 7th finger from the left on the end group of fingers 29. Thus the entire stock number is placed into the machine.

With the stock number properly entered, the operator presses a starting switch 78 and holds it only momentarily until the movements begin. When the solenoid of the first relay R-1 is energized, the current is passed to the motor M-1 for rotating the lead screw 25 which, in turn begins to move all of the carriages 19, 20, 21 and 22 simultaneously by the means formerly described. As soon as the first carriage 19 strikes the upraised stop pin 26, the entire upper U-shaped frame 18 is carried forward for seven-eighths of an inch, since the seventh stop finger in this group was depressed. When the finger hits the stop bar 30 I have provided a limit switch LS-1 which stops the movement of travel of the carriage 19 and simultaneously transfers the current to energize relay R-2 to supply current to the motor M-2 for rotation of the stop and identifying drums.

At the end of the portion of a revolution of the drums as previously set, the third finger of the outer group 57 will strike its stop bar 49 and engage a limit switch LS-2 which not only stops the motor M-2 for drum rotation but also transfers the current supply to energize the relay R-3 which supplies current to the four solenoids 59 placed in each of the carriages 19. When the solenoids energize, their respective plungers are drawn downwardly until the wrench heads 62 engage their respective stop pins 58. This downward movement of the several plungers also effects a rotation of the pinion 66 of each of the four mechanisms and a corresponding rotation to each of the square bars 72. It is now apparent that if the several stops have been previously set to a depth for the indicating arrow to read from left to right 4327, the arrows will again read the same number. Let it be supposed that the item corresponding to the code number 4327 is a suit of men's clothes, and that the price of the suit as set into the machine was $45.95. Then the indicating arrows will point to the figures 4595 for the identification of the code number. Since there are actually four movements in the arranging of each code number, it is apparent that if a zero occurs in the code number, that digit would simply not be entered which would cause no movement to the carriages or drums, or cause a movement which has been previously set to zero by the contact pins 58.

Let it be further supposed, now, that the price of the suit mentioned in the above example has been changed from $45.95 to $36.75 and the operator wishes to re-set the price so that subsequent identification by the machine will indicate the new price.

With the relay R-3 energized, current is not only supplied to the several solenoids for the indication of the number, but also is supplied to an additional relay R-4 which brings in a special A. C. circuit to the several "setting motors" M-3, M-4, M-5, and M-6. Each of these motors is connected to a pilot motor having a setting dial or crank by which the two motors in each group may be made to turn simultaneously any given number of revolutions. In other words, the pilot motor is of such type that it is made to lead its setting motor in either direction of rotating for the same number or even a portion of a revolution. Such a system is frequently used in various computing mechanisms and fire control instruments. Thus, while the wrench heads 62 are engaged with their several depth stops 58, the operator may engage each of the several motors separately to raise or lower the depth stop 58 so that the final price of $36.75 will be indicated by the arrows. It will be remembered that the motors and the extra circuit just described are not used in the identification of a stock or code number, but only to set the initial price of an item into the machine or to change such price as brought out above.

After the new price has been set into the machine, the operator brings all the movements back to a zero position by engaging the reversing switch S-1 which energizes both of the relays R-5 and R-6 to simultaneously reverse the current through both the motors M-1 and M-2. When M-1 is energized, the lead screw 25 begins to rotate in reverse direction, bringing the carriages 19, 20, 21 and 22 back toward the front of the machine until they engage a reverse limit switch LS-3 which stops the motor and locates the carriages in the zero or starting position.

Upon the reversing of motor M-2, the drums revolve in the opposite direction and finally engage their reverse limit switch LS-4 which breaks the current supply to the motor and locates the drum in the zero or starting position. It will be remembered that the two driving motors M-1 and M-2 are supplied with magnetic brakes 80 and 81 which are energized to release each time current is supplied to its respective motor, and which are arranged to stop its motor shaft immediately upon cessation of the current. By such arrangement, the various movements are made to stop at the exact point selected by the various setting fingers.

The limit switches together with the reversing switch S-1 are of the spring-return type and are adapted to be normally closed to hold the circuit is a closed position for the forward movement of the machine.

The starting switch is also of the spring-return, normally open type, and is held closed only momentarily until the main circuit can be closed through the reverse limit switch LS-3.

While the invention as described will indicate only a final figure of four digits, its is readily apparent from the above description that additional drums and carriages could be geared together and provided with indicating arrows to indicate as many digits in a number or price as desired. The indicating means might also be changed so that the indicating figures would oscillate against a fixed arrow or point instead of in the manner illustrated.

The machine is compact and indicates, in a matter of seconds, the price of an item corresponding to a catalog number. While I have shown the initial circuits of the machine as operating on direct current, it may also be made to operate on alternating current with a corresponding change in the circuit diagram. Other changes both in the construction of the various components and also of the electric circuits could be made without departing from the scope of my invention as defined by the following claims.

I claim:

1. In a machine of the class described, a plurality of tabulators, a plurality of adjustable means carried by each of said tabulators, a plurality of sensing means for examining said adjustable means, said sensing means being mounted for simultaneous movement relative to said tabulators, said sensing means being arranged respectively to examine the adjustable means carried by said tabulators, character means, stop means operable by said character means for controlling movement of said sensing means relative to said tabulators, said character combination determining the particular adjustable means on said tabulators examined by said sensing means, and means for indicating independently the adjustment of the adjustable means on each of said tabulators examined by said sensing means.

2. In a machine of the class described, a plurality of movably mounted tabulators, means for moving said tabulators simultaneously, a plurality of adjustable means carried by each of said tabulators, a plurality of sensing means for examining said adjustable means, said sensing means being mounted for simultaneous movement relative to said tabulators, said sensing means being arranged respectively to examine the adjustable means carried by said tabulators, character means, stop means operable by said character means for controlling movement of said tabulators, other stop means operable by said character means for controlling movement of said sensing means independently of said tabulators, and means for indicating independently the adjustment of the adjustable means on each of said tabulators examined by said sensing means.

3. In a machine of the class described, a plurality of rotatably mounted tabulators, means for rotating said tabulators simultaneously, a plurality of adjustable stop means carried by each of said tabulators, a plurality of sensing means for examining said adjustable stop means, said sensing means being mounted for simultaneous movement longitudinally of said tabulators, said sensing means being arranged respectively to examine the adjustable stop means of said tabulators, keyboard character means, stop means operable by said keyboard character means for controlling rotation of said tabulators, other stop means operable by said keyboard character means for controlling movement of said sensing means independently of said tabulators, said keyboard character combination determining the particular adjustable stop on said tabulators examined by said sensing means, and means for indicating independently the adjustment of the adjustable stop means on each of said tabulators examined by said sensing means.

4. In a machine of the class described, a plurality of rotatably mounted tabulators, means for rotating said tabulators simultaneously, a plurality of adjustable stop means carried by each of said tabulators, a plurality of sensing means for examining said adjustable stop means, said sensing means being mounted for simultaneous movement longitudinally of said tabulators, said sensing means being arranged respectively to examine the adjustable stop means of said tabulators, keyboard character means, stop means operable by said keyboard character means for controlling rotation of said tabulators, other stop means operable by said keyboard character means for controlling movement of said sensing means independently of said tabulators, said keyboard character combination determining the particular adjustable stop on said tabulators examined by said sensing means, and means for indicating independently the adjustment of the adjustable stop means on each of said tabulators examined by said sensing means.

5. In a machine of the class described, a plurality of rotatably mounted tabulators, means for rotating said tabulators simultaneously, a plurality of adjustable stop means carried by each of said tabulators, a plurality of sensing means for examining said adjustable stop means, said sensing means being mounted for simultaneous movement longitudinally of said tabulators, said sensing means being arranged respectively to examine the adjustable stop means of said tabulators, keyboard character means, stop means operable by said keyboard character means for controlling rotation of said tabulators, other stop means operable by said keyboard character means for controlling movement of said sensing means independently of said tabulators, said keyboard character combination determining the particular adjustable stop on said tabulators examined by said sensing means, a plurality of adjusting means operable independently to adjust said adjustable stop means on said tabulators to any of a plurality of possible settings, one said adjusting means being associated with each of said tabulators, and means for indicating independently the adjustment of the adjustable stop means on each of said tabulators examined by said sensing means.

CLIFFORD LEE SINGLETON.

REFERENCES CITED

The following references are of record in the file of this patent:

UNITED STATES PATENTS

| Number | Name | Date |
|---|---|---|
| 1,992,945 | Haselton et al. | Mar. 5, 1935 |
| 2,136,672 | Calkins | Nov. 15, 1938 |
| 2,145,032 | Smith | Jan. 24, 1939 |